(12) United States Patent
Shinkai et al.

(10) Patent No.: US 10,905,042 B2
(45) Date of Patent: Feb. 2, 2021

(54) CONTROLLER FOR MASTER WORK VEHICLE AND METHOD FOR CONTROLLING MASTER WORK VEHICLE

(71) Applicant: Kubota Corporation, Osaka (JP)

(72) Inventors: Atsushi Shinkai, Sakai (JP); Megumi Suzukawa, Amagasaki (JP); Kenji Tamatani, Amagasaki (JP); Izuru Shimamoto, Amagasaki (JP); Takafumi Morishita, Amagasaki (JP); Kazuo Sakaguchi, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 212 days.

(21) Appl. No.: 15/987,905

(22) Filed: May 24, 2018

(65) Prior Publication Data

US 2018/0338408 A1    Nov. 29, 2018

(30) Foreign Application Priority Data

May 29, 2017    (JP) ................................ 2017-105911

(51) Int. Cl.
*A01B 69/04*    (2006.01)
*G05D 1/02*    (2020.01)

(52) U.S. Cl.
CPC ......... *A01B 69/008* (2013.01); *G05D 1/0219* (2013.01); *G05D 1/0287* (2013.01); *G05D 1/0295* (2013.01); *G05D 2201/0201* (2013.01)

(58) Field of Classification Search
CPC ............... G05D 1/0287; G05D 1/0295; G05D 2201/0201; G05D 3/00; G05D 13/00; G05D 2201/00; G05D 2201/02; G05D 2201/0208; G05D 2201/021; G05D 1/00; G05D 1/02; G05D 1/0219; G05D 1/0221; G05D 1/0223; G05D 1/0225; G05D 1/0227; G05D 1/0246; G05D 1/0268; G05D 1/0274; G05D 1/0276; G05D 1/0278; A01D 41/1278; A01B 69/008; A01B 69/007;

(Continued)

(56) References Cited

U.S. PATENT DOCUMENTS

| 6,732,024 B2 * | 5/2004 | Wilhelm Rekow . A01B 69/008 340/901 |
| 2012/0215381 A1 * | 8/2012 | Wang ................. A01D 41/1278 701/2 |
| 2016/0120095 A1 | 5/2016 | Fujimoto et al. |

FOREIGN PATENT DOCUMENTS

| JP | 2015-221614 | 12/2015 |
| JP | 2015-188351 | 11/2016 |
| WO | WO-2012110543 A1 * | 8/2012 ........... A01B 69/008 |

* cited by examiner

*Primary Examiner* — Anthony R Jimenez
(74) *Attorney, Agent, or Firm* — Mori & Ward, LLP (57) ABSTRACT

A controller for a master work vehicle, includes a wireless circuit, an acquisition circuit, a message generation circuit, and a display control circuit. The wireless circuit is to receive, from a slave work vehicle configured to travel automatically, first information indicating a state of work travel of the slave work vehicle. The master work vehicle is configured to work in cooperation with the slave work vehicle. The acquisition circuit is configured to acquire second information indicating a state of work travel of the master work vehicle. The message generation circuit is configured to generate a first message based on the first information and a second message based on the second information. The display control circuit is configured to control a display to display the first message and the second message.

8 Claims, 6 Drawing Sheets

(58) Field of Classification Search
CPC . B60W 2050/0014; B60W 2050/0013; B60W 2050/0019; B60W 2050/0026; B60W 2050/0028; B60W 2050/0027; B60W 2050/0031; B60W 2050/004; B60W 40/00; G01C 21/00; G01C 21/04; G01C 21/10; G01C 21/14; G01C 21/16; G01C 21/20; G01C 21/34; G01C 21/36; G01C 21/3626
USPC .......................................................... 701/50
See application file for complete search history.

CONTROLLER FOR MASTER WORK VEHICLE AND METHOD FOR CONTROLLING MASTER WORK VEHICLE

CROSS-REFERENCE TO RELATED APPLICATIONS

The present application claims priority under 35 U.S.C. § 119 to Japanese Patent Application No. 2017-105911, filed May 29, 2017. The contents of this application are incorporated herein by reference in their entirety.

BACKGROUND OF THE INVENTION

Field of the Invention

The present invention relates to a controller for a master work vehicle and a method for controlling a master work vehicle.

Discussion of the Background

JP 2015-188351 A discloses a work vehicle cooperation system in which a master work vehicle and an unmanned-navigation type slave work vehicle that emulates the master work vehicle perform ground work. This system includes: a master position detection module that detects a master position, which is a position of the master work vehicle; a slave position detection module that detects a slave position, which is a position of the slave work vehicle; a slave traveling target calculation unit that calculates a target traveling position of the slave work vehicle based on a traveling track of the master work vehicle; a master parameter generation unit that generates a master work/driving parameter relating to work/driving executed by the master work vehicle, the master work/driving parameter being linked with the master position; a slave parameter generation unit that generates a slave work/driving parameter for the slave work vehicle based on the master work/driving parameter, the slave work/driving parameter being linked with the corresponding target traveling position of the slave work vehicle; and a navigation control unit that navigates the slave work vehicle in an unmanned manner based on the slave position, the target traveling position, and the slave work/driving parameter. The master parameter generation unit generates the master work/driving parameter relating to work/driving executed by the master work vehicle, the master work/driving parameter being linked with the position of the master work vehicle. In addition, based on this master work/driving parameter, the slave parameter generation unit generates the slave work/driving parameter for the slave work vehicle, the slave work/driving parameter being linked with the target traveling position of the slave work vehicle corresponding to the position of the master work vehicle. With this configuration, work/driving of the slave work vehicle that reliably emulates the work/driving of the master work vehicle is realized based on the work/driving parameter and the target traveling position.

JP 2015-221614 A discloses a cooperative work system including: an autonomous travel work vehicle that is controlled to automatically perform work and travel along a route; and an accompanying travel work vehicle that performs work while accompanying the autonomous travel work vehicle at a position distant from the autonomous travel work vehicle by a predetermined distance. A monitor device of the accompanying travel work vehicle and a control device of the autonomous travel work vehicle are connected to achieve data exchange therebetween by wireless communications. The monitor device is configured to display a route that is set, and a state of the autonomous travel work vehicle.

SUMMARY OF THE INVENTION

According to one aspect of the present invention, a controller for a master work vehicle, includes a wireless circuit, an acquisition circuit, a message generation circuit, and a display control circuit. The wireless circuit is to receive, from a slave work vehicle configured to travel automatically, first information indicating a state of work travel of the slave work vehicle. The master work vehicle is configured to work in cooperation with the slave work vehicle. The acquisition circuit is configured to acquire second information indicating a state of work travel of the master work vehicle. The message generation circuit is configured to generate a first message based on the first information and a second message based on the second information. The display control circuit is configured to control a display to display the first message and the second message.

According to another aspect of the present invention, a controller for a master work vehicle, includes receiving means, acquisition means, message generation means, and display control means. The receiving means are for receiving, from a slave work vehicle configured to travel automatically, first information indicating a state of work travel of the slave work vehicle. The master work vehicle is configured to work in cooperation with the slave work vehicle. The acquisition means are for acquiring second information indicating a state of work travel of the master work vehicle. The message generation means are for generating a first message based on the first information and a second message based on the second information. The display control means are for controlling a display to display the first message and the second message.

According to a further aspect of the present invention, a method for a master work vehicle, includes receiving, from a slave work vehicle configured to travel automatically, first information indicative of a state of work travel of the slave work vehicle. The master work vehicle is configured to work in cooperation with the slave work vehicle. The method includes acquiring a state of work travel of the master work vehicle. The method includes generating second information based on the state of work travel of the master work vehicle. The method includes generating a first message based on the first information and a second message based on the second information. The method includes controlling a display to display the first message and the second message.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

With reference to the drawings, a description will be given of a master work vehicle according to an embodiment of the present invention, the master work vehicle being configured to perform work in cooperation with a slave work vehicle capable of unmanned automatic travel. In this embodiment, the slave work vehicle and the master work vehicle correspond to tractors being work vehicles that are substantially equal in function to each other. Each of the slave work device and the master work device is equipped with a work device that is mounted to the back side of a vehicle body thereof. Each of the slave work device and the master work device performs work (cultivating work in this embodiment) along a route that is set for a field being work land.

Figure 1:
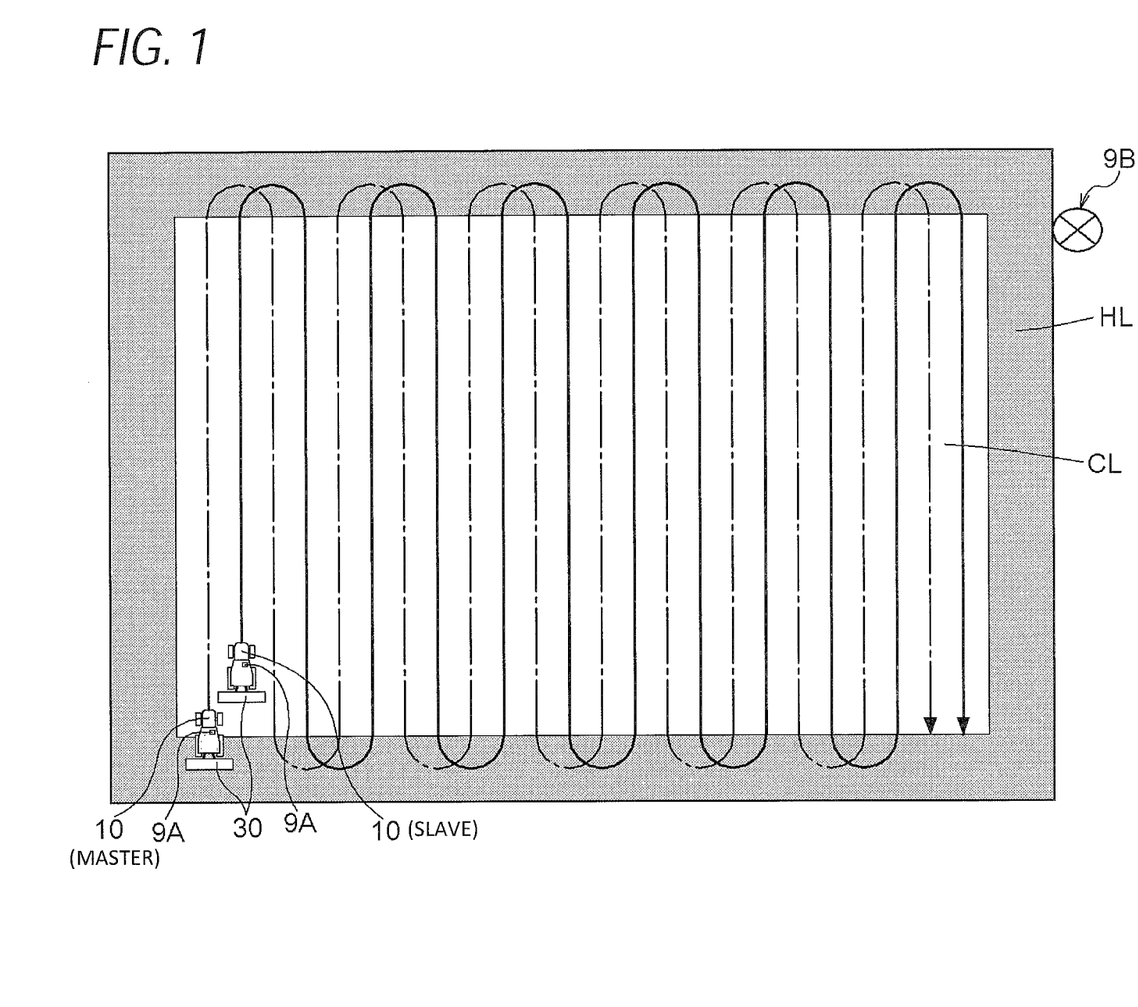
FIG. 1 is an explanatory view of a state of cooperative work performed by a master work vehicle and a slave work vehicle.

In cooperative cultivating work illustrated in FIG. 1, of the two tractors, a slave tractor (hereinafter referred to as "slave work vehicle") that is a tractor prefixed with a word "slave" precedes and a master tractor (hereinafter, referred to as "master work vehicle") that is a tractor prefixed with a word "master" follows the slave work vehicle so as to cultivate a region slightly overlapping with a region cultivated by the preceding slave work vehicle. As a matter of course, the master work vehicle may precede, and the slave work vehicle may follow the master work vehicle. Alternatively, the slave work vehicle and the master work vehicle may perform work and travel on different parcels of a field independently of each other. The field illustrated in FIG. 1 is divided into a central work land CL at the center of the field, and a headland HL on the periphery of the central work land CL, the headland HL being specified by ridges. Each work vehicle travels straight along a target route that is set in advance on the central work land CL. After arriving at the headland HL, each work vehicle turns around and travels straight again on the central work land CL. Finally, one or both of the work vehicles travels or travel on the headland HL.

The two work vehicles are capable of automatic travel along a set target route. The two work vehicles may take cooperative travel modes such as a first cooperative travel mode, a second cooperative travel mode, and a third cooperative travel mode. In the first cooperative travel mode, the master work vehicle travels manually by a driver-administrator riding therein while the slave work vehicle travels automatically. In the second cooperative travel mode, both the master work vehicle and the slave work vehicle travel automatically, and an observer rides in the master work vehicle. In the third cooperative travel mode, both the master work vehicle and the slave work vehicle travel automatically in an unmanned manner, and the observer observes work and travel states of the respective master work vehicle and slave work vehicle at the outside of the master work vehicle. In any case, the observer issues a basic command such as an emergency stop of the master work vehicle and slave work vehicle.

Figure 2:
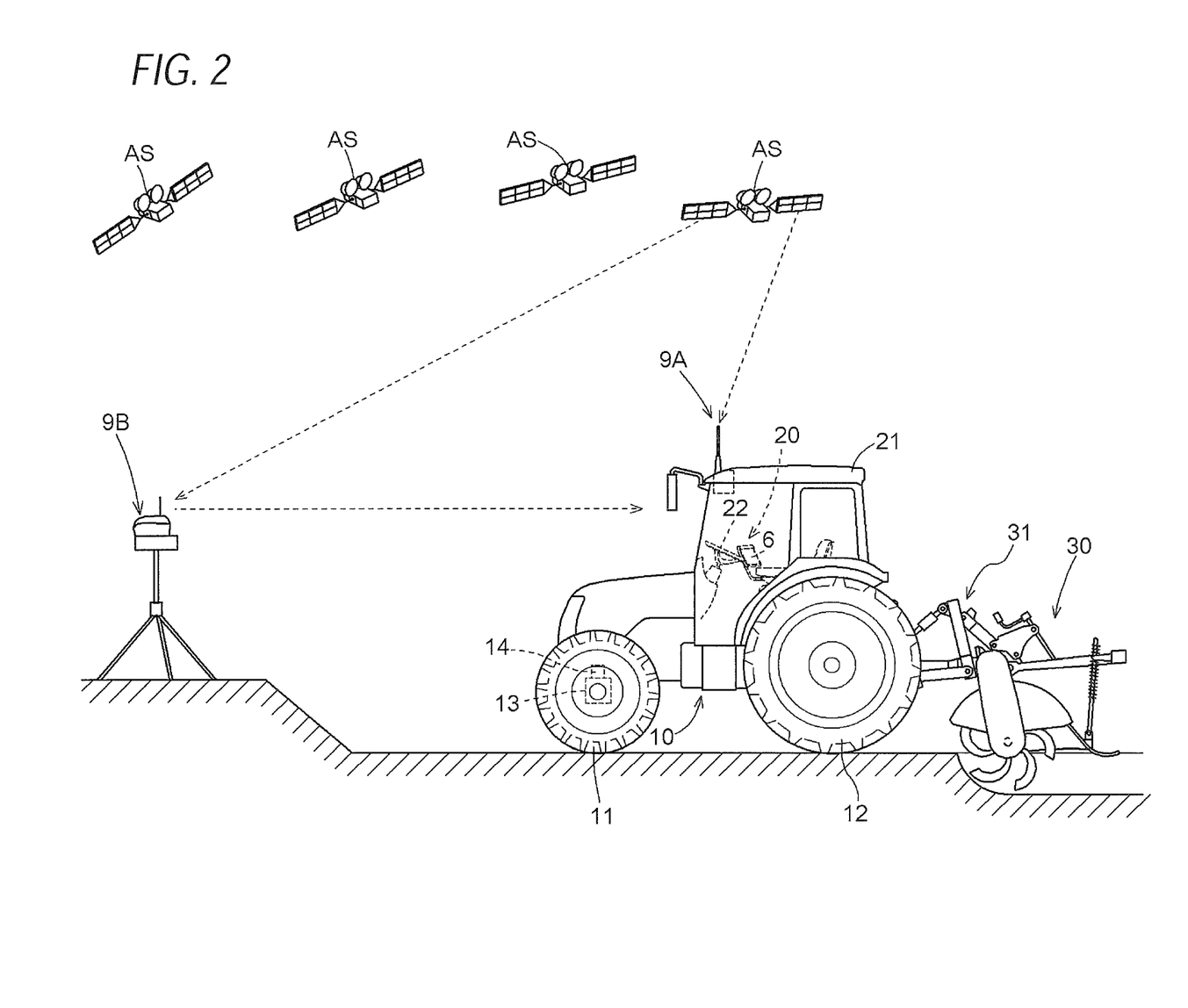
FIG. 2 is a side view of a tractor being an example of a work vehicle capable of unmanned travel.

In this embodiment, the master work vehicle and the slave work vehicle are tractors substantially equal in configuration to each other. As illustrated in FIG. 2, in the work vehicle, a cockpit section 20 is disposed at a center of a vehicle body 10 supported by front wheels 11 and rear wheels 12. A cultivating device 30 of a rotary type being a work device is mounted to the back side of the vehicle body 10 with a lifting mechanism 31 of a hydraulic type. The front wheels 11 serve as driving wheels. A traveling direction of the tractor is changed when a steering angle is changed by a steering mechanism 13. The steering mechanism 13 includes a steering motor 14 for automatic steering. In manual travel, the front wheels 11 are steered using a steering wheel 22 disposed in the cockpit section 20. In this embodiment, a general-purpose terminal device 6 constituted of a tablet computer is attached to a cradle mounted on a cockpit in the cockpit section 20. The general-purpose terminal device 6 is configured to transmit wireless data. Even when an administrator detaches the general-purpose terminal device 6 from the cradle to take the general-purpose terminal device 6 out of the work vehicle, the general-purpose terminal device 6 enables the exchange of data by communications with a control system in the tractor. The general-purpose terminal device 6 is configured to give information to a driver or an administrator and to receive information from the driver or the administrator.

Also in this embodiment, as illustrated in FIG. 2, each of the master work vehicle and the slave work vehicle employs a real time kinematic-global positioning system (RTK-GPS) method as a satellite positioning system. The satellite positioning system includes a satellite positioning base station unit 9B and an on-vehicle satellite positioning unit 9A each being a basic constituent element. The satellite positioning base station unit 9B is installed near the field. The satellite positioning base station unit 9B generates correction data based on position coordinates being a parameter indicative of a position of the satellite positioning base station unit 9B and radio waves from satellites AS. The satellite positioning base station unit 9B then transmits the correction data to the on-vehicle satellite positioning unit 9A. A satellite antenna is mounted on a ceiling region of a cabin 21 of the tractor to receive a global navigation satellite system (GNSS) signal (including a global positioning system (GPS) signal). For complementation of satellite navigation using the satellite positioning system, the on-vehicle satellite positioning unit 9A may be combined with an inertial navigation module including a gyro/acceleration sensor and a magnetic azimuth sensor. The inertial navigation module may be installed at a place different from a place where the on-vehicle satellite positioning unit 9A is installed.

Figure 3:
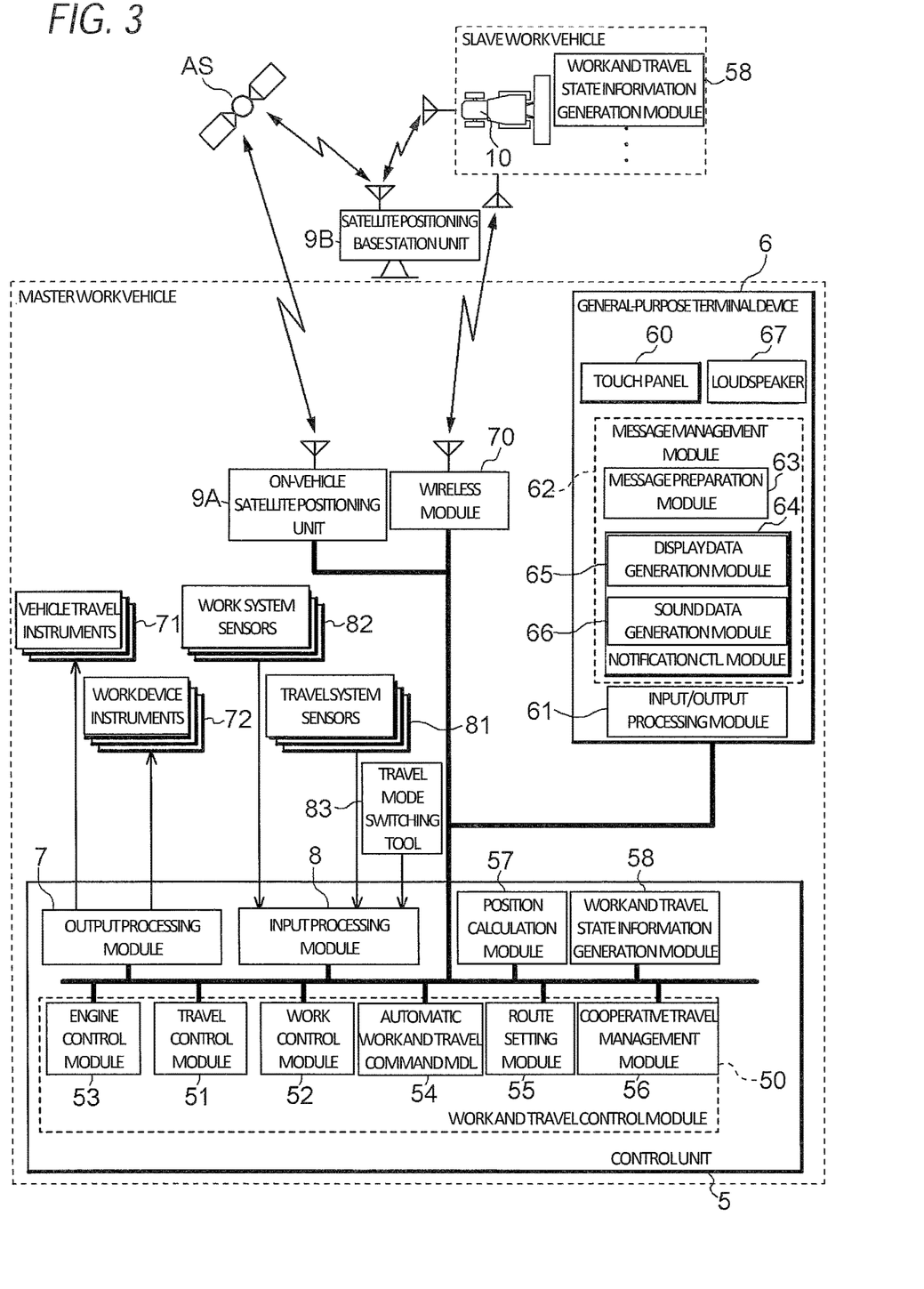
FIG. 3 shows the configuration of a control system in the master work vehicle.

FIG. 3 is the configuration of the control system in the work vehicle. A control unit 5 is a core element of the control system and includes an output processing module 7 and an input processing module 8 as an input/output interface. A wireless module 70 is operative by a plurality of communication methods and is connected to the control unit 5. The wireless module 70 establishes wireless communications with different wireless communication instruments. The wireless module 70 also establishes wireless communications with a wireless module 70 of another work vehicle. The wireless module 70 is therefore used for data exchange between work vehicles (i.e., a master work vehicle and a slave work vehicle) and for data exchange with a general-purpose terminal device 6 removed from a work vehicle, at the outside of the work vehicle. As illustrated in FIG. 3, the control unit 5 is connected to the general-purpose terminal device 6 and the on-vehicle satellite positioning unit 9A via, for example, an on-vehicle local area network (LAN). The on-vehicle satellite positioning unit 9A is a vehicle-side constituent element of the satellite positioning system.

The output processing module 7 is connected to vehicle travel instruments 71 and work device instruments 72. The vehicle travel instruments 71 include control instruments for vehicle travel, such as an engine control instrument, a transmission control instrument, a braking control instrument, and a steering control instrument. The work device instruments 72 include, for example, a power control instrument such as a power take-off (PTO) clutch for control of power transmission to the cultivating device 30, and a lifting cylinder control instrument of the lifting mechanism 31 lifting up and down the cultivating device 30.

The input processing module 8 is connected to, for example, travel system sensors 81, work system sensors 82, and a travel mode switching tooling tool 83. The travel mode switching tool 83 is a switch for selecting one of an automatic travel mode in which the work vehicle travels by automatic steering and a manual steering mode in which the work vehicle travels by manual steering. For example, when the driver actuates the travel mode switching tool 83 at the time of travel in the automatic steering mode, the work vehicle is switched to travel by manual steering. On the other hand, when the driver actuates the travel mode switching tool 83 at the time of travel in the manual steering, the work vehicle is switched to travel by automatic steering. The travel system sensors 81 include sensors to detect states of operating tools such as an engine speed adjuster, an accelerator pedal, a brake pedal, and the steering wheel 22. The work system sensors 82 include sensors to detect a driving state and an orientation of the cultivating device 30.

The control unit 5 includes a work and travel control module 50, a position calculation module 57, and a work and travel state information generation module 58. The position calculation module 57 successively receives positioning data from the on-vehicle satellite positioning unit 9A, and calculates a current position being a coordinate position (i.e., map coordinates or field coordinates) of the vehicle body 10, based on the positioning data.

The work and travel control module 50 includes a travel control module 51, a work control module 52, an engine control module 53, an automatic work and travel command module 54, a route setting module 55, and a cooperative travel management module 56. The travel control module 51 controls the vehicle travel instruments 71 such as the steering motor 14. The work vehicle is capable of both the automatic travel (automatic steering) and the manual travel (manual steering). The travel control module 51 therefore is configured to control the work vehicle to travel manually and automatically. The travel control module 51 controls the vehicle travel instruments 71 based on operations by the driver in order to control the work vehicle to travel manually. The travel control module 51 controls the vehicle travel instruments 71 based on automatic steering commands from the automatic work and travel command module 54 in order to control the work vehicle to travel automatically. The work control module 52 transmits work control signals to the work device instruments 72 to control the movements of the cultivating device 30. The engine control module 53 transmits an engine control signal to an engine operating instrument.

The route setting module 55 receives field information and reads contour data of the field from the field information to generate and set an appropriate route on the field. The route is generated based on basic initial parameters given by the driver or the observer. Alternatively, the route setting module 55 may download a route that is generated by a different computer and set the route. The route generated by the route setting module 55 or the route acquired through the download is developed onto a memory and is set at a target route in the automatic travel. Also in the manual travel, the route is used for guidance in order that the work vehicle travels along the route.

The automatic work and travel command module 54 calculates a directional deviation and a positional deviation between a route set at a target route by the route setting module 55 and a current position calculated by the position calculation module 57. The automatic work and travel command module 54 then generates automatic steering commands for resolving the directional deviation and positional deviation, and issues the automatic steering commands to the travel control module 51.

In cooperative work with another cooperating work vehicle (i.e., a master work vehicle or a slave work vehicle), the cooperative travel management module 56 issues a request for generation and setting of a route to the route setting module 55 so that the route setting module 55 generates and sets the route, based on a cooperative travel pattern while taking a route of the other cooperating work vehicle into consideration. The cooperative travel management module 56 is configured to acquire a travel state and a work state of the other cooperating tractor to control the work and travel of the other cooperating tractor, and to be controlled by the other cooperating work vehicle as to the work and travel.

The work and travel state information generation module 58 generates work and travel state information indicative of the work and travel state of the work vehicle. The work and travel state information is referred to as master work and travel state information when the work vehicle is a master work vehicle. On the other hand, the work and travel state information is referred to as slave work and travel state information when the work vehicle is a slave work vehicle. The work and travel state information generation module 58 generates the work and travel state information, based on detection data and control data, for example. The work and travel state information generation module 58 receives the detection data from the travel system sensors 81 and the work system sensors 82 through the input processing module 8. The control data is handled by the work and travel control module 50. The work and travel state information contains warning information to the driver or the observer. Examples of the warning information include: inclination of the vehicle body 10 beyond a permissive level; positional deviation of a current position from a target route beyond a permissible range; engine trouble such as overheating; fuel exhaustion; and battery exhaustion. When the warning information is generated, the driver or the observer is notified of the waning information. If necessary, the driver or the observer halts the vehicle body 10, stops the engine, and ceases the automatic travel.

The work and travel state information generated by the work and travel state information generation module 58 is transferred to the general-purpose terminal device 6 that functions as a display device in this embodiment. The general-purpose terminal device 6 displays various kinds of information, for the driver and the administrator.

The general-purpose terminal device 6 is substantially a computer configured to communicate wireless data, like a tablet computer. The general-purpose terminal device 6 includes a touch panel 60, a loudspeaker 67, an input/output processing module 61, and the like as standard components. In addition, the general-purpose terminal device 6 has installed therein a computer program constructing a message management module 62. The message management module 62 includes a message preparation module 63 and a notification control module 64.

The message preparation module 63 receives work and travel state information generated by the work and travel state information generation module 58 of the slave work vehicle, from the slave work vehicle by wireless communications. The message preparation module 63 then prepares a slave state message describing a state of the slave work vehicle, from the work information state information. The message preparation module 63 also receives work and travel state information generated by the work and travel state information generation module 58 of the work vehicle (i.e., the master work vehicle). The message preparation module 63 then prepares a master state message describing a state of the work vehicle (i.e., the master work vehicle), from the work information state information. For example, when the warning information indicates that the vehicle body 10 is inclined beyond the permissive level, the message preparation module 63 prepares a state message indicating "slave work vehicle (or master work vehicle) is halted because of abnormal inclination." In response to this, the state message is confirmed by the driver or the observer.

The notification control module 64 includes a display data generation module 65. The display data generation module 65 generates display data of a state message (e.g., a master state message or a slave state message) prepared by the message preparation module 63, and then transmits the display data to the touch panel 60. The touch panel 60 thus displays on its screen a message corresponding to the display data. The notification control module 64 makes the slave state message to be displayed on the screen clearly indicate that the slave state message concerns the slave work vehicle. The notification control module 64 also makes the master state message to be displayed on the screen clearly indicate that the master state message concerns the master work vehicle. To this end, additional information is added to the slave state message and the master state message, for discrimination between the slave state message and the master state message.

In this embodiment, examples of the additional information include visual information that stimulates vision and auditory information that stimulates audition. The display data generation module 65 generates various kinds of visual information as will be described later. The auditory information in this embodiment refers sound data of different timbre. A sound data generation module 66 generates sound data to be assigned to the master work vehicle and sound data to be assigned to the slave work vehicle. Alternatively, the sound data generation module 66 has these pieces of sound data that have been recorded thereon in advance.

The sound data generation module 66 may generate sound data of a state message prepared by the message preparation module 63, in the format of voice data. The driver or the observer may be notified of the state message by voice through the loudspeaker 67.

Figure 4:
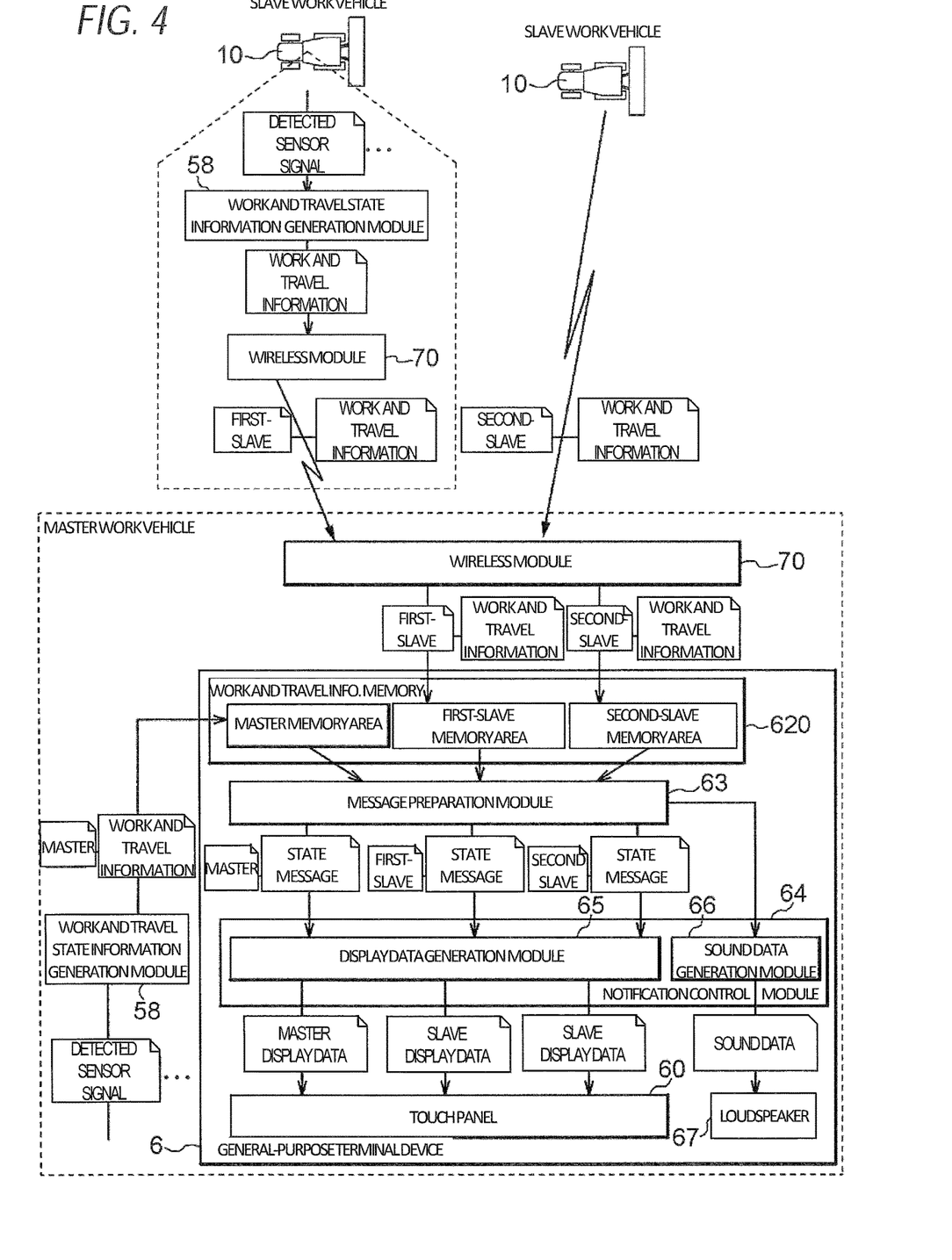
FIG. 4 shows operations of the master work vehicle and the slave work vehicle.

With reference to FIG. 4, next, a description will be given of data flow in a process of displaying a state message on a screen. In this embodiment, one master work vehicle and two slave work vehicles (i.e., a first slave work vehicle and a second slave work vehicle) participate in cooperative work.

In the master work vehicle, work and travel information generated by the work and travel state information generation module 58 is sent to the general-purpose terminal device 6, based on, for example, a sensor signal. The work and travel information is added with a code (e.g., "master" in FIG. 4) for identifying a source. The work and travel information is therefore recorded in a master memory area of a work and travel information memory 620 assigned to the memory of the general-purpose terminal device 6.

Also in the slave work vehicle, likewise, work and travel information generated by the work and travel state information generation module 58 is sent to the general-purpose terminal device 6 of the master work vehicle, via the wireless module 70. The work and travel information is added with a code (e.g., "first-slave" or "second-slave" in FIG. 4) for identifying a source. The work and travel information is therefore recorded in a first-slave memory area or a second-slave memory area of the work and travel information memory 620.

The message preparation module 63 reads the work and travel information from the work and travel information memory 620. The message preparation module 63 then prepares a state message (i.e., a master state message, a first-slave state message, a second-slave state message) describing a state of the corresponding work vehicle. The message preparation module 63 gives the prepared state message to the notification control module 64.

The notification control module 64 generates display data of the received state message, and transmits the display data to the touch panel 60. At this time, when auditory information is selected as additional information for identifying a state message source (e.g., the master work vehicle or the slave work vehicle), the message preparation module 63 gives a source code indicative of the state message source to the sound data generation module 66. The sound data generation module 66 therefore transmits, to the loudspeaker 67, sound data of timbre for the source code. The loudspeaker 67 thus outputs sound based on the sound data. When visual information is selected as additional information for identifying a state message source, display data in a visually identifiable format is generated as will be described later. The touch panel 60 displays the generated display data. Alternatively, the touch panel 60 displays the state message while the loudspeaker 67 outputs the state message by voice.

With reference to FIGS. 5 to 8, a description will be given of exemplary forms for identifying a state message source.

Figure 5:
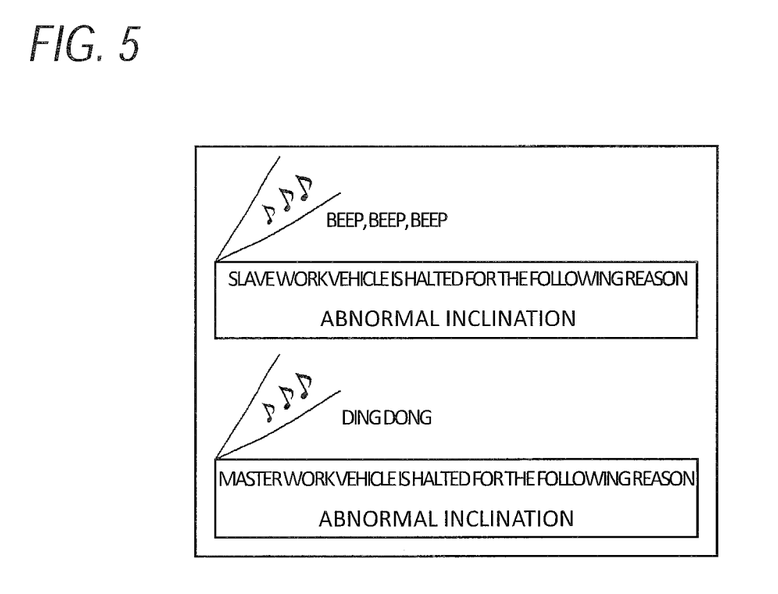
FIG. 5 is a schematic view of a first form for discrimination between a master state message and a slave state message.

In the exemplary form illustrated in FIG. 5, the state message source is identified with sound of different timbre. When the state message source is the slave work vehicle, the touch panel 60 displays the slave state message while the loudspeaker 67 outputs sound of first timbre, "beep, beep, beep". When the state message source is the master work vehicle, the touch panel 60 displays the master state message while the loudspeaker 67 outputs sound of second timbre, "ding dong".

Figure 6:
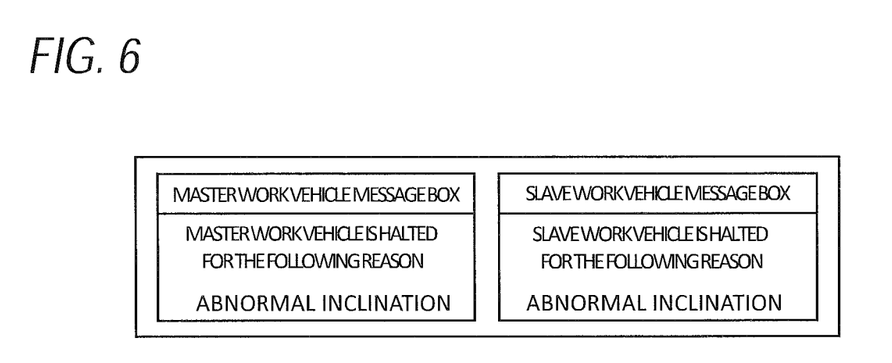
FIG. 6 is a schematic view of a second form for discrimination between the master state message and the slave state message.

In the exemplary form illustrated in FIG. 6, a slave state message box and a master state message box are displayed on the screen in addition to the respective state messages. When the state message source is the slave work vehicle, the slave state message is displayed in the slave state message box. When the state message source is the master work vehicle, the master state message is displayed in the master state message box. This is effective when a display region for each state message is larger.

Figure 7:
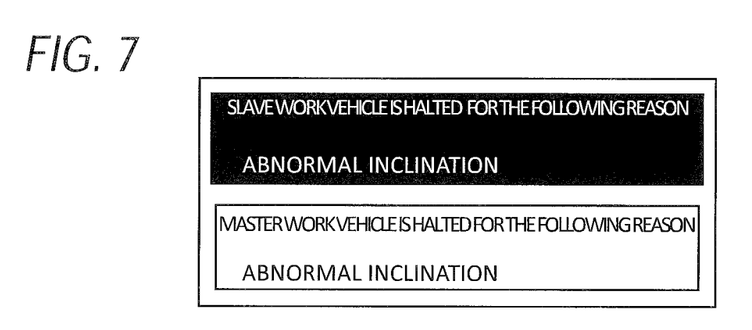
FIG. 7 is a schematic view of a third form for discrimination between the master state message and the slave state message.

In the exemplary form illustrated in FIG. 7, the slave state message, of which the source is the slave work vehicle, is displayed with a first text color and a first background color. On the other hand, the master state message, of which the source is the master work vehicle, is displayed with a second text color and a second background color. The first text color is different from the second text color, and the first background color is different from the second background color. As a matter of course, only the first and second text colors may be different from each other. Alternatively, only the first and second background colors may be different from each other.

Figure 8:
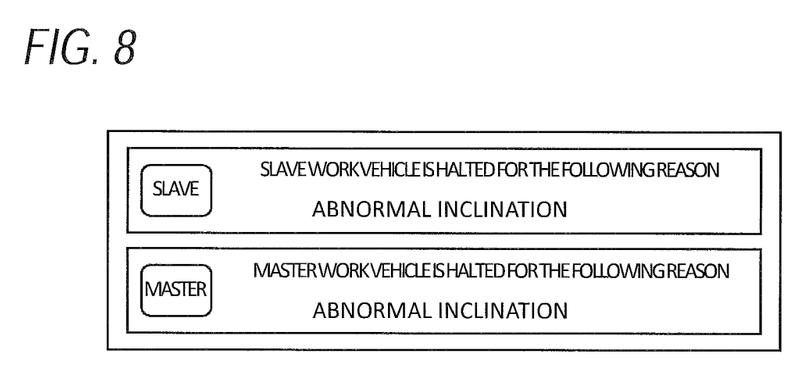
FIG. 8 is a schematic view of a fourth faun for discrimination between the master message and the slave message.

In the exemplary form illustrated in FIG. 8, the slave state message, of which the source is the slave work vehicle, is displayed in conjunction with a slave display item indicative of the slave work vehicle. In this embodiment, an icon of a word "slave" is displayed as the slave display item in front of the slave state message. On the other hand, the master state message, of which the source is the master work vehicle, is displayed in conjunction with a master display item indicative of the master work vehicle. In this embodiment, an icon of a word "master" is displayed as the master display item in front of the master state message. The slave display item and the master display item may be graphical images of various designs. The display data generation module 65 combines the slave state message with the slave display item to generate slave display data. In addition, the display data generation module 65 combines the master state message with the master display item to generate master display data.

Various forms for clearly identifying a state message source, such as those illustrated in FIGS. 7 and 8, may be selected based on the details of the state message or may be selected in accordance with observer's preference. Alternatively, two or more forms may be combined.

It should be noted that the configuration disclosed in the foregoing embodiment (including the other embodiments; the same applies hereinafter) may be applied in conjunction with the configurations disclosed in the other embodiments as long as no contradiction arises. The embodiments disclosed herein are merely illustrative. The present invention therefore is not limited to the embodiments, and the embodiments may be appropriately modified without departing from the scope of the present invention.

Other Embodiments (1) Since the message management module 62 is constructed in the general-purpose terminal device 6, the state message may be confirmed at the outside of the work vehicle through the general-purpose terminal device 6 removed from the work vehicle. Instead of this configuration, the message management module 62 may be constructed in the control unit 5 with the general-purpose terminal device 6 disabled to be removed from the work vehicle. In this case, a display, such as a liquid crystal display, of the work vehicle is used for displaying a state message.

(2) The modules illustrated in FIGS. 3 and 4 are mainly segmented for the sake of description. In practical use, the respective modules may be integrated with one another or each module may be further divided into multiple modules. Note that each module can be constituted by a circuit, a program to be executed by a processor, or a combination of the circuit and the program.

(3) In the foregoing embodiment, the tractor equipped with the cultivating device 30 being a work device is described as a work vehicle. The present invention is alternatively applicable to, in addition to the tractor, various work vehicles such as construction work vehicles and agricultural work vehicles including a rice-planting machine, a fertilizing machine, and a combined harvester and thresher. In addition, multiple work vehicles for cooperative work are not necessary the same in type as one another. For example, one of the work vehicles may be a combined harvester and thresher, and another one of the work vehicles may be a tractor.

(4) In the foregoing embodiment, the master work vehicle performs the cooperative work in cooperation with the slave work vehicle. It is needless to say that the master work vehicle is also used to perform work solely. In displaying a state message, it is therefore unnecessary to discriminate the master work vehicle from the slave work vehicle. A state message of which the source is the master work vehicle is always displayed. However, the state message of which the source is the master work vehicle is may be displayed in a highlighted manner as described above. In addition, the state message may be notified by voice. Alternatively, the state message may be notified by voice without being displayed. In cases where the observer uses the general-purpose terminal device 6 at the outside of the work vehicle, the observer may listen to the state message through a canalphone or a headphone so as to shut off from surrounding noise.

The present invention is applicable to a work vehicle configured to perform work in cooperation with a work vehicle capable of unmanned automatic travel and to establish wireless data communications with the work vehicle capable of unmanned automatic travel.

A preferred embodiment of the present invention provides a master work vehicle to perform work in cooperation with a slave work vehicle capable of unmanned automatic travel. The master work vehicle includes a wireless module, a work and travel state information generation module, a display device, a message preparation module, and a notification control module. The wireless module receives, from the slave work vehicle, slave work and travel state information indicative of a work and travel state of the slave work vehicle. The work and travel state information generation module generates master work and travel state information indicative of a work and travel state of the master work vehicle. The display device displays various kinds of information. The message preparation module prepares a slave state message describing a state of the slave work vehicle, from the slave work and travel state information, and prepares a master state message describing a state of the master work vehicle, from the master work and travel state information. The notification control module controls the display device to display the slave state message and the master state message and adds additional information to the slave state message and the master state message, for discrimination between the slave state message and the master state message.

As used herein, the terms "master work vehicle" and "slave work vehicle" are used for convenience of description and each mean a work vehicle. The present invention is not limited to a specific work vehicle, "master work vehicle", but is applied to a typical work vehicle.

With this configuration, the display device displays a slave state message describing a state of the slave work vehicle, the slave state message being prepared from slave work and travel state information indicative of a work and travel state of the slave work vehicle, and a master state message describing a state of the master work vehicle, the master state message being prepared from master work and travel state information indicative of a work and travel state of the master work vehicle. At this time, additional information that clearly determines which one of a message on the master work vehicle and a message on the slave work vehicle is displayed on the display device makes an observer more accurately ascertain the message displayed on the display device. The observer in the master work vehicle thus ascertains, without confusion, a work and travel state of the slave work vehicle and a work and travel state of the master work vehicle through the display device.

A preferable example of the additional information for determining which one of the slave state message and the master state message is displayed on the display device is to output sound assigned to the master work vehicle or the slave work vehicle in addition to the display of the message. In other words, information on a work and travel state is more accurately transmitted by a combination of a visual information transmission method with an auditory information transmission method. From this point of view, according to a preferred embodiment of the present invention, the slave state message is displayed on the display device in conjunction with sound of first timbre, and the master state message is displayed on the display device in conjunction with sound of second timbre different from the first timbre.

Preferably, a slave state message and a master state message are made different in display form from each other in order to clearly determine whether a message displayed on the display device is directed to either the master work vehicle or the slave work vehicle. An example of such a display form is to divide a display region of the display device into a region where the slave state message is displayed and a region where the master state message is displayed. According to a preferred embodiment of the present invention, therefore, a slave state message box in which the slave state message is to be displayed and a master state message box in which the master state message is to be displayed are prepared for the notification control module.

According to another embodiment, the slave state message is displayed with one or both of a first text color and a first background color, and the master state message is displayed with one or both of a second text color and a second background color respectively different from the first text color and the first background color. Use of a display device capable of color display makes an observer easily discriminate the slave state message from the master state message in such a manner that the text and background constituting the slave state message are made different in color from the text and background constituting the master state message.

In communication tools such as a chat, an icon or nickname of a person who has sent a message is provided in front of the message in order to ascertain who sends the message at a glance. The present invention also preferably employs such a discrimination method in order to determine which state message indicative of a work and travel state is displayed. In a preferred embodiment of the present invention, therefore, a slave display item indicative of the slave work vehicle and a master display item indicative of the master work vehicle are prepared for the notification control module, slave display data is generated by a combination of the slave state message with the slave display item, and master display data is generated by a combination of the master state message with the master display item. Each of the slave display item and the master display item may be, for example, an icon, an illustration, a graphical image, a symbol, or a character that facilitates discrimination between the slave work vehicle and the master work vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A controller for a master work vehicle, comprising:
a wireless circuit to receive, from a slave work vehicle configured to travel automatically, first information indicating a state of work travel of the slave work vehicle, the master work vehicle being configured to work in cooperation with the slave work vehicle;
an acquisition circuit configured to acquire second information indicating a state of work travel of the master work vehicle;
a message generation circuit configured to generate a first message based on the first information and a second message based on the second information and to generate discrimination information to discriminate between the first message and the second message;
a display control circuit configured to control a display to display both of the first message and the second message in the display; and
a notification circuit configured to provide the discrimination information when the first message and the second message are displayed,
wherein the discrimination information includes sound data,
wherein the notification circuit outputs sound of first timbre based on the sound data when the first message is displayed, and
wherein the notification circuit outputs sound of second timbre based on the sound data when the second message is displayed, the second timbre being different from the first timbre.

2. The controller according to claim 1,
wherein the discrimination information includes display data, and
wherein the notification circuit controls the display, based on the display data, to display a first message box in which the first message is to be displayed and a second message box in which the second message is to be displayed.

3. The controller according to claim 1,
wherein the discrimination information includes display data,
wherein the notification circuit defines at least one of a first text color and a first background color of the first message based on the display data such that the at least one of the first text color and the first background color is different from a corresponding color of the second message.

4. The controller according to claim 1,
wherein the discrimination information includes display data,
wherein the notification circuit controls the display, based on the display data, to display a first display item indicative of the slave work vehicle such that the first display item is displayed in relation to the first message, and
wherein the notification circuit controls the display, based on the display data, to display a second display item indicative of the master work vehicle such that the second display item is displayed in relation to the second message.

5. A master work vehicle comprising:
the controller according to claim 1; and
a cooperative travel management circuit configured to generate a first route based on a second route, the master work vehicle being configured to travel along the first route, the slave work vehicle being configured to travel along the second route.

6. The work vehicle according to claim 5, wherein the cooperative travel management circuit is configured to control the slave work vehicle to travel along the second route.

7. A controller for a master work vehicle, comprising:
receiving means for receiving, from a slave work vehicle configured to travel automatically, first information indicating a state of work travel of the slave work vehicle, the master work vehicle being configured to work in cooperation with the slave work vehicle;
acquisition means for acquiring second information indicating a state of work travel of the master work vehicle;
message generation means for generating a first message based on the first information and a second message based on the second information;
display control means for controlling a display to display both of the first message and the second message in the display;
discrimination information generation means for generating discrimination information to discriminate between the first message and the second message; and
notification means for providing the discrimination information when the first message and the second message are displayed,
wherein the discrimination information includes sound data,
wherein the notification means outputs sound of first timbre based on the sound data when the first message is displayed, and
wherein the notification means outputs sound of second timbre based on the sound data when the second message is displayed, the second timbre being different from the first timbre.

8. A method for controlling a master work vehicle, comprising:
receiving, from a slave work vehicle configured to travel automatically, first information indicative of a state of work travel of the slave work vehicle, the master work vehicle being configured to work in cooperation with the slave work vehicle;
acquiring a state of work travel of the master work vehicle;
generating second information based on the state of work travel of the master work vehicle;
generating a first message based on the first information and a second message based on the second information;
controlling a display to display both of the first message and the second message in the display;
generating discrimination information to discriminate between the first message and the second message; and
providing the discrimination information when the first message and the second message are displayed,
wherein the discrimination information includes sound data,
wherein sound of first timbre is provided based on the sound data when the first message is displayed, and
wherein sound of second timbre is provided based on the sound data when the second message is displayed, the second timbre being different from the first timbre.

* * * * *